United States Patent
Lai

(10) Patent No.: US 10,737,618 B2
(45) Date of Patent: Aug. 11, 2020

(54) DEVICE AND METHOD FOR IDENTIFYING RELATIVE POSITION BETWEEN OBJECTS

(71) Applicant: Advanced Semiconductor Engineering, Inc., Kaohsiung (TW)

(72) Inventor: Yen-Chen Lai, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 358 days.

(21) Appl. No.: 15/483,812

(22) Filed: Apr. 10, 2017

(65) Prior Publication Data

US 2018/0293892 A1 Oct. 11, 2018

(51) Int. Cl.
| | |
|---|---|
| B60Q 9/00 | (2006.01) |
| G01C 21/30 | (2006.01) |
| G01S 5/02 | (2010.01) |
| G01S 5/00 | (2006.01) |
| G08G 1/16 | (2006.01) |
| G01S 19/51 | (2010.01) |
| G01S 19/13 | (2010.01) |

(52) U.S. Cl.
CPC ............ *B60Q 9/008* (2013.01); *G01C 21/30* (2013.01); *G01S 5/0072* (2013.01); *G01S 5/0284* (2013.01); *G01S 19/51* (2013.01); *G08G 1/163* (2013.01); *G01S 19/13* (2013.01)

(58) Field of Classification Search
None
See application file for complete search history.

(56) References Cited

U.S. PATENT DOCUMENTS

| | | | |
|---|---|---|---|
| 4,257,703 A * | 3/1981 | Goodrich | G01S 11/12 340/436 |
| 7,065,245 B2 | 6/2006 | Toda | |
| 8,195,394 B1 | 6/2012 | Zhu et al. | |
| 9,342,074 B2 | 5/2016 | Dolgov et al. | |
| 9,381,918 B1 | 7/2016 | Ferguson et al. | |
| 9,436,181 B2 | 9/2016 | Peeters et al. | |
| 9,489,601 B2 | 11/2016 | Fairfield et al. | |
| 9,499,172 B2 | 11/2016 | Urmson et al. | |
| 9,519,287 B1 | 12/2016 | Szybalski et al. | |
| 9,523,984 B1 | 12/2016 | Herbach et al. | |
| 9,534,918 B2 | 1/2017 | Nemec et al. | |
| 2012/0010811 A1 * | 1/2012 | Hamada | G01C 21/32 701/468 |
| 2015/0032362 A1 * | 1/2015 | Goudy | G08G 1/166 701/301 |

* cited by examiner

*Primary Examiner* — Abdhesh K Jha
(74) *Attorney, Agent, or Firm* — Foley & Lardner LLP

(57) ABSTRACT

The present disclosure relates to a computer-implemented method. The method includes: receiving a first metric of a first object; receiving a second metric of a second object; calculating a distance between the first object and the second object based on the first metric and the second metric; comparing the calculated distance with a predetermined distance; identifying whether the second object is approaching the first object based on the first metric and the second metric; calculating an elevational difference between the first object and the second object; and generating a notification responsive to the calculated distance being less than the predetermined distance, the second object being identified as approaching the first object and the calculated elevational difference between the first object and the second object being less than a predetermined value.

14 Claims, 3 Drawing Sheets

DEVICE AND METHOD FOR IDENTIFYING RELATIVE POSITION BETWEEN OBJECTS

BACKGROUND

1. Technical Field

The present disclosure relates to a device and method for identifying relative positions between objects, and more particularly, to a device and method for identifying relative positions between two vehicles.

2. Description of the Related Art

A collision avoidance system may include a blind spot monitor that detects other vehicles located at a driver's side and rear area, and may send warnings (e.g., visual, audible, vibrating, or tactile) to the driver. However, the camera-based monitor cannot accurately detect other vehicles under bad weather conditions (such as thick fog or heavy rain). Therefore, it would be desirable to develop a collision avoidance system that can function accurately under bad weather conditions.

SUMMARY

In accordance with some embodiments of the present disclosure, a computer-implemented method includes: receiving a first metric of a first object; receiving a second metric of a second object; calculating a distance between the first object and the second object based on the first metric and the second metric; comparing the calculated distance with a predetermined distance; identifying whether the second object is approaching the first object based on the first metric and the second metric; calculating an elevational difference between the first object and the second object; and generating a notification responsive to the calculated distance being less than the predetermined distance, the second object being identified as approaching the first object and the calculated elevational difference between the first object and the second object being less than a predetermined value.

In accordance with some embodiments of the present disclosure, a system for identifying a relative position between a first object and a second object includes a receiver and a processor. The receiver is configured to receive a first metric of the first object and a second metric of the second object. The processor is configured to calculate a distance between the first object and the second object based on the first metric and the second metric; compare the calculated distance with a predetermined distance; identify whether the second object is approaching the first object based on the first metric and the second metric; calculate an elevational difference between the first object and the second object; and generate a notification responsive to the calculated distance being less than the predetermined distance, the second object being identified as approaching the first object and the calculated elevational difference between the first object and the second object being less than a predetermined value.

In accordance with some embodiments of the present disclosure, a non-transitory computer readable medium on which instructions are stored is provided, the instructions, when executed by one or more processors, cause the one or more processors to perform a method. The method includes receiving a first metric of a first object; receiving a second metric of a second object; calculating a distance between the first object and the second object based on the first metric and the second metric; comparing the calculated distance with a predetermined distance; identifying whether the second object is approaching the first object based on the first metric and the second metric; calculating an elevational difference between the first object and the second object; and generating a notification responsive to the calculated distance being less than the predetermined distance, the second object being identified as approaching the first object and the calculated elevational difference between the first object and the second object being less than a predetermined value.

Figure 1:
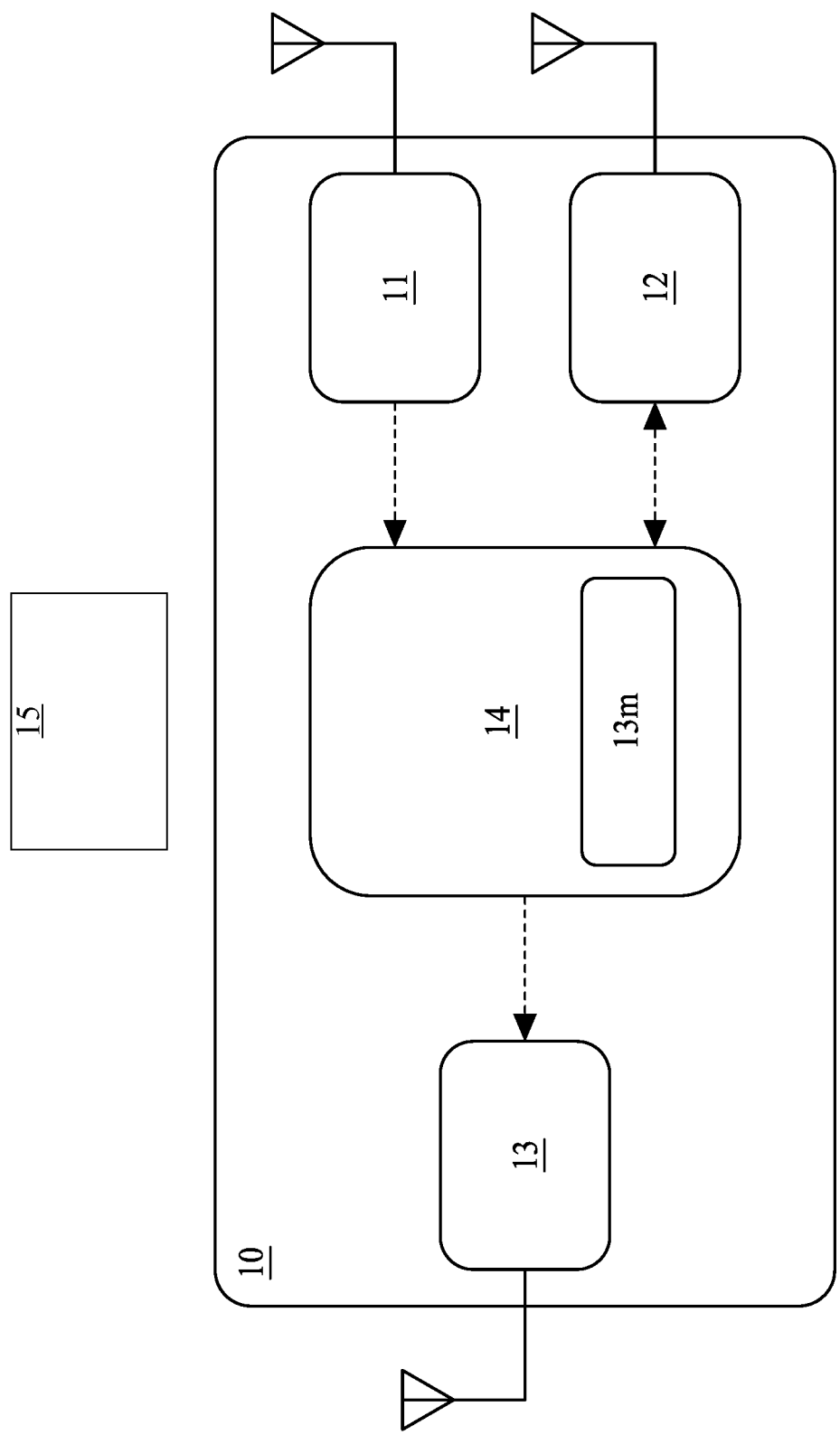
FIG. 1 illustrates a block diagram of a collision detection system in accordance with some embodiments of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

FIG. 1 illustrates a block diagram of a collision detection system 1 in accordance with some embodiments of the present disclosure. The collision detection system 1 includes a wireless communication system 10. In some embodiments, the wireless communication system 10 can include one or more dedicated short-range communication (DSRC) devices that can provide public and/or private data communications between vehicles and/or roadside stations. Other wireless protocols for sending and receiving information embedded in signals, such as various vehicular communication systems, can also be employed by the wireless communication system 10 within the context of the present disclosure. The wireless communication system 10 includes a first transceiver 11, a second transceiver 12, a third transceiver 13, a processor 14 and at least an antenna.

The first transceiver 11 (or receiver) may be, but is not limited to, a global positioning system (GPS) receiver or transceiver. The first transceiver 11 is configured to receive information or metrics (such as a latitude, a longitude, an elevation, a speed, a heading direction and the like) of a first object (e.g., a first vehicle) equipped with the collision detection system 1. For example, the first transceiver 11 is operable to provide information regarding the position of the vehicle with respect to the Earth.

The second transceiver 12 (or broadcaster) is configured to transmit information or metrics (such as a latitude, a longitude, an elevation, a speed, a heading direction and the like) of the first vehicle relative to another object (e.g., a second vehicle) and to receive information (such as a latitude, a longitude, an elevation, a speed, a heading direction and the like) of the second vehicle. In some embodiments, the transmission and the reception operation of the second transceiver 12 can be carried out by any wireless network, such as a local area network (LAN), metropolitan area network (MAN), wide area network (WAN), public data network (e.g., the Internet), short range wireless network, or any other suitable packet-switched network, such as a commercially owned, proprietary packet-switched network (e.g., a proprietary cable or fiber-optic network), or the like, or any combination thereof. In addition, the wireless network may be, for example, a cellular network and may employ various technologies including, but not limited to, enhanced data rates for global evolution (EDGE), general packet radio service (GPRS), global system for mobile communications (GSM), Internet protocol multimedia subsystem (IMS), universal mobile telecommunications system (UMTS), or the like, as well as any other suitable wireless medium, such as worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), or the like, or any combination thereof. In some embodiments, the second transceiver 12 and the first transceiver 11 can be integrated into a single transceiver.

The processor 14 is configured to receive data from the first transceiver 11 and the second transceiver 12, to calculate the relative positions of the first vehicle and the second vehicle, to determine whether or not a collision may occur between the first vehicle and the second vehicle and to generate a warning message if the collision may occur. In some embodiments, the processor 14 determines that the collision may occur if all of the following conditions are met: (i) a distance between the first vehicle and the second vehicle is less than a predetermined distance; (ii) the second vehicle is approaching the first vehicle; and (iii) an elevation difference between the first vehicle and the second vehicle is less than a predetermined value. In some embodiments, the predetermined value of the elevation different is equal to or less than about 10 meters (m) or any other suitable value depending on design specifications.

The distance between the first vehicle and the second vehicle can be calculated based on the latitudes and longitudes of the vehicles. The predetermined distance is determined based on a maximum speed of the first vehicle and the second vehicle. If the maximum speed is higher, the predetermined distance should be larger. For example, if the maximum speed is in a range from about 0 to about 24 kilometers/hour (km/h), the predetermined distance is about 17.5 meter; if the maximum speed is in a range from about 24 to about 40 km/h, the predetermined distance is ((the maximum speed−24)×1.02)+17.5; if the maximum speed is in a range from about 40 to about 56 km/h, the predetermined distance is ((the maximum speed−40)×1.26)+33.8; or if the maximum speed is in a range from about 56 to about 72 km/h, the predetermined distance is ((the maximum speed−56)×1.48)+53.9. In some embodiments, the predetermined distance can be any other suitable value depending on design specifications.

A route of the first vehicle can be represented by a linear equation (e.g., $y_1 = ax_1 + b$, wherein $x_1$ and $y_1$ are the position of the first vehicle, and a and b are constants). The constants a and b can be calculated by linear regression. For example, a plurality of the positions of the first vehicle are used for the following equations to calculate the constants a and b:

$$a = \frac{(n\Sigma xy) - (\Sigma x \Sigma y)}{(n\Sigma x^2) - (\Sigma x)^2}, \quad b = \frac{(\Sigma y \Sigma x^2) - (\Sigma x \Sigma xy)}{(n\Sigma x^2) - (\Sigma x)^2},$$

where n represents a number of data points and is equal to or greater than 5.

Then, whether the second vehicle is located at the right side or the left side of the route of the first vehicle is determined by putting the position of the second vehicle (represented by $x_2, y_2$) into the linear equation (representing the route of the first vehicle). If the value on the left side of the linear equation is greater than the value on the right side of the linear equation, the second vehicle is on the left side of the first vehicle; otherwise, the second vehicle is on the right side of the first vehicle.

After determining whether the second vehicle is on the left or right side of the first vehicle, the moving direction (or heading direction) of the second vehicle can be determined. In some embodiments, it is assumed that the moving direction of the first vehicle is about 45 degrees. If the moving direction of the second vehicle is about 135 degrees, the second vehicle is heading toward the left side of the moving direction of the first vehicle. If the moving direction of the second vehicle is about 315 degrees, the second vehicle is heading toward the right side of the moving direction of the first vehicle. In other words, if the heading direction of the second vehicle equals the heading direction of the first vehicle plus about 90 degrees, the second vehicle is heading toward the left side of the moving direction of the first vehicle. If the heading direction of the second vehicle equals the heading direction of the first vehicle minus about 90 degrees, the second vehicle is heading toward the right side of the moving direction of the first vehicle. In some embodiments, if the calculated heading direction of the second vehicle is greater than 360 degrees, the calculated heading direction should have 360 degrees subtracted therefrom. If the calculated heading direction of the second vehicle is less than 0 degrees, the calculated heading direction should have 360 degrees added thereto.

In some embodiments, the processor 14 determines that the second vehicle is approaching the first vehicle under any of the following conditions: (i) the second vehicle is located at the right side of the moving direction of the first vehicle and heading to the left side of the moving direction of the first vehicle; or (ii) the second vehicle is located at the left side of the moving direction of the first vehicle and heading to the right side of the moving direction of the first vehicle. The processor 14 determines that the second vehicle is traveling away from the first vehicle under any of the following conditions: (i) the second vehicle is located at the right side of the moving direction of the first vehicle and heading to the right side of the moving direction of the first vehicle; or (ii) the second vehicle is located at the left side of the moving direction of the first vehicle and heading to the left side of the moving direction of the first vehicle.

The processor 14 is then configured to generate a message or notification in a case when the calculated distance is less than the predetermined distance, the second vehicle is approaching the first vehicle and the elevation difference between the first vehicle and the second vehicle is less than the predetermined value. In some embodiments, the processor 14 is connected to the third transceiver 13 and the message generated by the processor 14 is then transmitted to the third transceiver 13. The third transceiver 13 (or transmitter) is configured to send the message to driver(s) of the first vehicle and/or the second vehicle. In some embodiments, the message can be sent by any of a wireless network (e.g., as the second transceiver 12) or by wiring. In some embodiments, the third transceiver 13 can be integrated into the processor 14. In some embodiments, the third transceiver 13 and one or both of the second transceiver 12 and the first transceiver 11 can be integrated into a single transceiver. In some embodiments, the notification is displayed to a driver via a display device 15.

In some embodiments, the processor 14 may be a microcontroller unit (MCU) that includes a processing unit, a memory 13m (e.g., random-access memory (RAM) and read-only memory (ROM)), a clock and an input/output (I/O) control unit. The processor 14 may include configurable blocks of analog and digital logic as well as programmable interconnects.

In accordance with some embodiments of the present disclosure, the collision detection system 1 calculates the relative positions of two vehicles based on data, such as a latitude, a longitude, an elevation, a speed, a heading direction and the like, received by using a wireless network rather than a camera. Therefore, in comparison with a camera-based collision detection system, the collision detection system 1 shown in FIG. 1 can function normally and accurately even under bad weather conditions.

Figure 2:
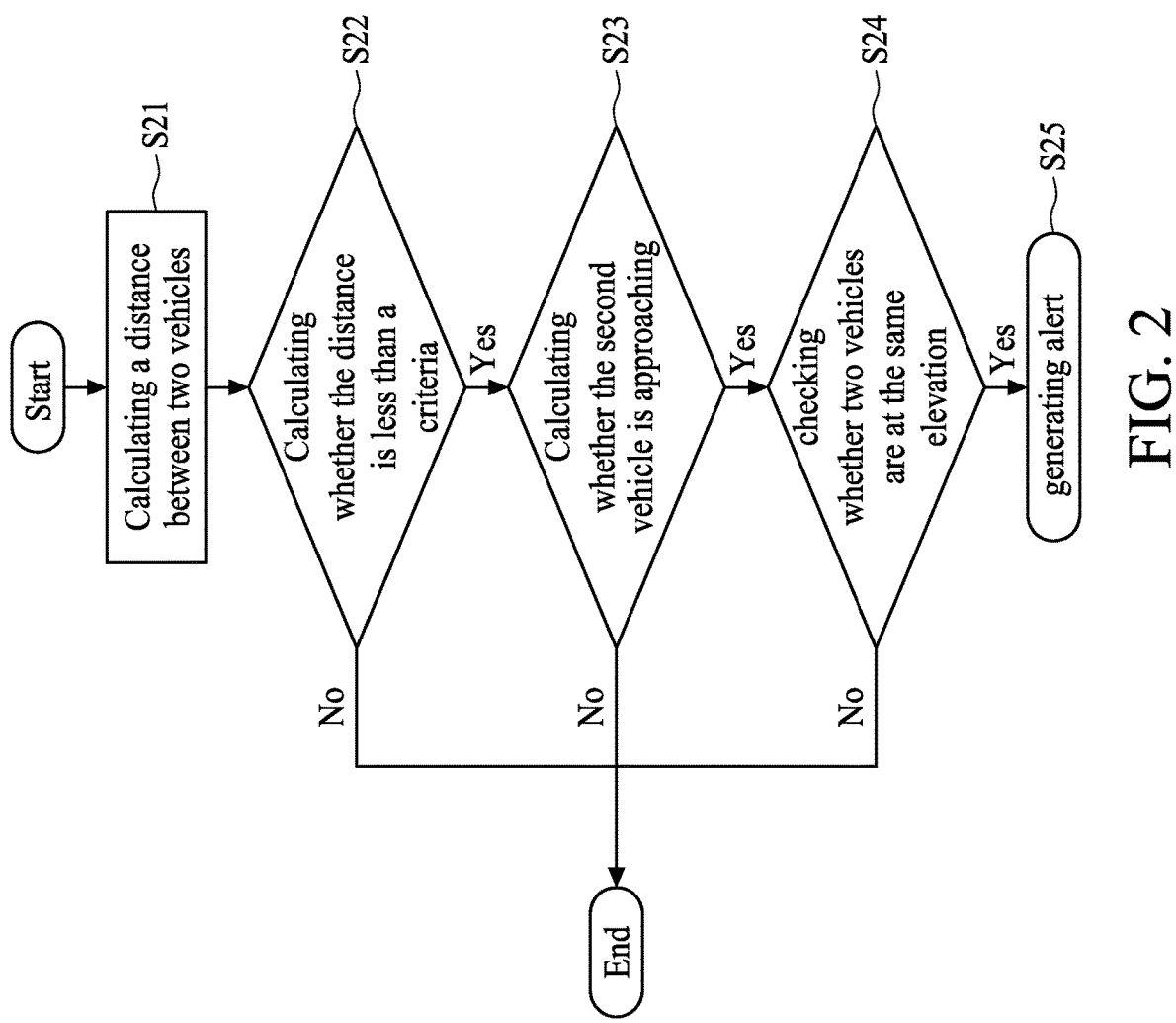
FIG. 2 illustrates a method for detecting a possible collision between two vehicles in accordance with some embodiments of the present disclosure.

FIG. 2 illustrates a flow chart showing a method for detecting a possible collision between two vehicles.

Referring to step S21, a distance between a first vehicle and a second vehicle is calculated based on their latitudes and longitudes. In some embodiments, the latitudes and the longitudes of the first vehicle and the second vehicle are obtained by a wireless transceiver (e.g., GPS).

Referring to step S22, the calculated distance is compared with a predetermined distance (e.g., criteria) to check whether the calculated distance is less than the predetermined distance. If the calculated distance is less than the predetermined distance, the operation moves to step S23; otherwise, the operation of collision detection is terminated.

In some embodiments, the predetermined distance is determined based on a maximum speed of the first vehicle and the second vehicle. If the maximum speed is higher, the predetermined distance should be larger. For example, if the maximum speed is in a range from about 0 to about 24 km/h, the predetermined distance is about 17.5 m; if the maximum speed is in a range from about 24 to about 40 km/h, the predetermined distance is ((the maximum speed−24)×1.02)+17.5; if the maximum speed is in a range from about 40 to about 56 km/h, the predetermined distance is ((the maximum speed−40)×1.26)+33.8; or if the maximum speed is in a range from about 56 to about 72 km/h, the predetermined distance is ((the maximum speed−56)×1.48)+53.9. In some embodiments, the predetermined distance can be any other suitable value depending on design specifications.

Referring to step S23, moving directions and speeds of the first vehicle and the second vehicle are calculated to check whether the second vehicle is approaching the first vehicle. The moving directions and the speeds of the first vehicle and the second vehicle can be derived from their latitudes and the longitudes. If the second vehicle is approaching the first vehicle, the operation moves to step S24; otherwise, the operation of collision detection is terminated.

Figure 3:
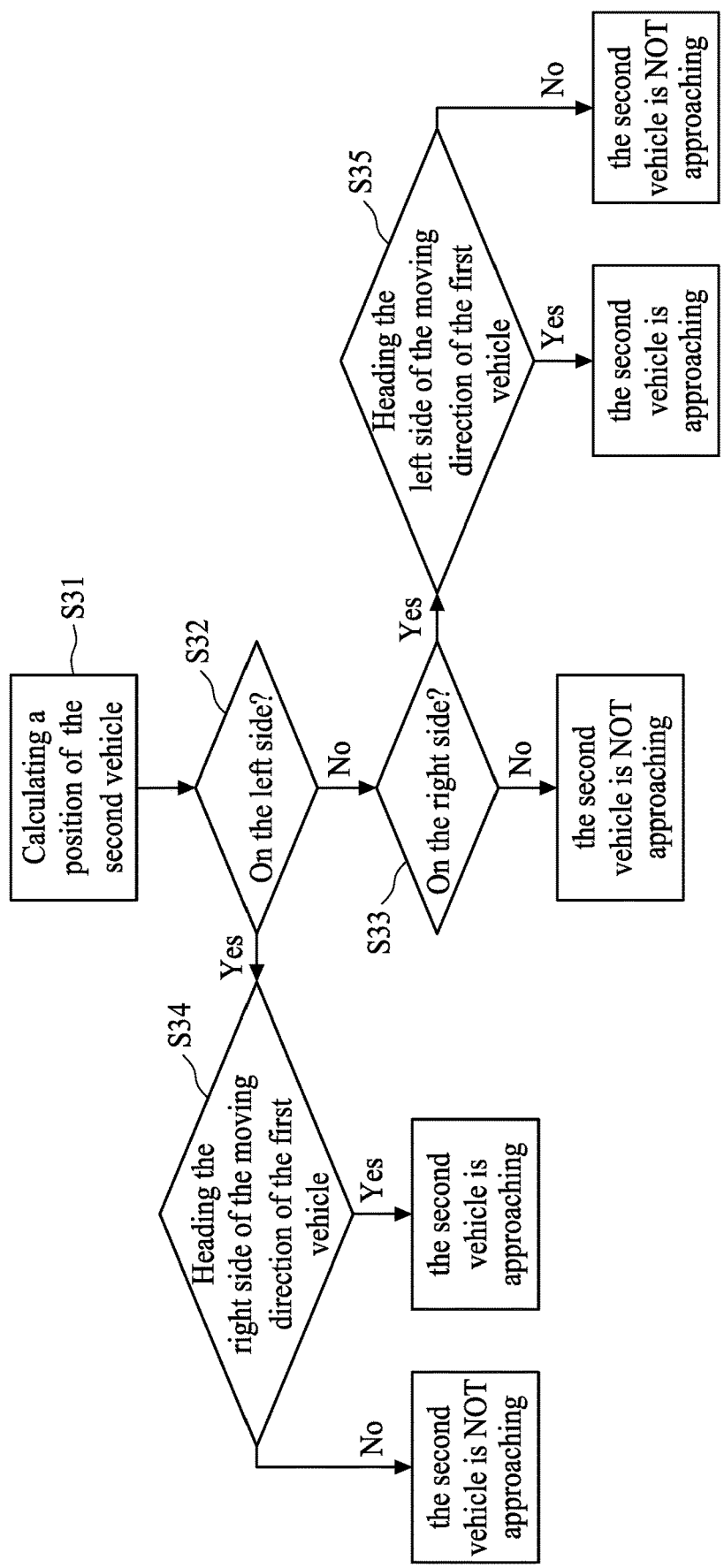
FIG. 3 illustrates a method for detecting a possible collision between two vehicles in accordance with some embodiments of the present disclosure.

In some embodiments, whether the second vehicle is approaching the first vehicle can be determined according to a flow chart shown in FIG. 3. Referring to FIG. 3 and step S31, a position of the second vehicle relative to the first vehicle is determined. At step S32, it is determined whether the second vehicle is at a left side of the first vehicle. For example, if the second vehicle is at the left side of the first vehicle, the operation moves to step S34; otherwise, the operation moves to step S33. In some embodiments, the position of the second vehicle relative to the first vehicle can be determined by using a linear equation (e.g., $y_1 = ax_1 + b$, wherein $x_1$ and $y_1$ are the position of the first vehicle, a and b are constants) representing a route of the first vehicle. The constants a and b can be calculated by linear regression. For example, a plurality of the positions of the first vehicle are used for the following equations to calculate the constants a and b:

$$a = \frac{(n\Sigma xy) - (\Sigma x \Sigma y)}{(n\Sigma x^2) - (\Sigma x)^2}, b = \frac{(\Sigma y \Sigma x^2) - (\Sigma x \Sigma xy)}{(n\Sigma x^2) - (\Sigma x)^2},$$

where n is equal to or greater than 5.

Then, whether the second vehicle is located at the right side or the left side of the route of the first vehicle is determined by putting the position of the second vehicle (represented by $x_2$, $y_2$) into the linear equation (representing the route of the first vehicle). If the value on the left side of the linear equation is greater than the value on the right side of the linear equation, the second vehicle is on the left side of the first vehicle; otherwise, the second vehicle is on the right side of the first vehicle.

After determining whether the second vehicle is on the left or right side of the first vehicle, the moving direction (or heading direction) of the second vehicle can be determined. In some embodiments, it is assumed that the moving direction of the first vehicle is about 45 degrees. If the moving direction of the second vehicle is about 135 degrees, the second vehicle is heading toward the left side of the moving direction of the first vehicle. If the moving direction of the second vehicle is about 315 degrees, the second vehicle is heading toward the right side of the moving direction of the first vehicle. In other words, if the heading direction of the second vehicle equals the heading direction of the first vehicle plus about 90 degrees, the second vehicle is heading toward the left side of the moving direction of the first vehicle. If the heading direction of the second vehicle equals the heading direction of the first vehicle minus about 90 degrees, the second vehicle is heading toward the right side of the moving direction of the first vehicle. In some embodiments, if the calculated heading direction of the second vehicle is greater than about 360 degrees, the calculated heading direction should have about 360 degrees subtracted therefrom. If the calculated heading direction of the second vehicle is less than 0 degrees, the calculated heading direction should have 360 degrees added thereto.

Referring to step S34, if the second vehicle is heading to the right side of the moving direction of the first vehicle, it is determined that the second vehicle is approaching the first vehicle. If the second vehicle is heading to the left side of the moving direction of the first vehicle, it is determined that the second vehicle is traveling away from the first vehicle.

Referring to step S35, if the second vehicle is heading to the left side of the moving direction of the first vehicle, it is determined that the second vehicle is approaching the first vehicle. If the second vehicle is heading to the right side of the moving direction of the first vehicle, it is determined that the second vehicle is traveling away from the first vehicle.

Referring back to FIG. 2, in step S24, an elevation difference between the first vehicle and the second vehicle is calculated based on the elevations of the first vehicle and the second vehicle obtained by a wireless transceiver (e.g., GPS). If the elevation difference between the first vehicle and the second vehicle is less than a predetermined value, the operation moves to step S25; otherwise, the operation of the collision detection is terminated. In some embodiments, the predetermined value of the elevation difference is about 10 m or any other suitable value depending on design specifications.

Referring to step S25, an alert (or a message) is generated in the case that all of the conditions determined in steps S22, S23 and S24 are met. For example, the alert or message is generated in the case that the calculated distance is less than the predetermined distance, the second vehicle is approaching to the first vehicle and the elevation difference between the first vehicle and the second vehicle is less than the predetermined value.

In some embodiments, the alert or message can be sent to the driver(s) of the first vehicle and/or the second vehicle by any of a wireless network or by wiring. For example, the data transmitted or received by the first vehicle and/or the second vehicle can be communicated by any wireless network, such as LAN, MAN, WAN, public data network (e.g., the Internet), short range wireless network, or any other suitable packet-switched network, such as a commercially owned, proprietary packet-switched network (e.g., a proprietary cable or fiber-optic network), or the like, or any combination thereof. In addition, the wireless network may be, for example, a cellular network, and may employ various technologies including EDGE, GPRS, GSM, IMS, UMTS, or the like, as well as any other suitable wireless medium, such as WiMAX, LTE networks, CDMA, WCDMA, WiFi, WLAN, Bluetooth, IP data casting, satellite, MANET, or the like, or any combination thereof.

In accordance with some embodiments of the present disclosure, the collision detection is carried out based on the data of two vehicles received by using a wireless network rather than a camera. Therefore, in comparison with a camera-based collision detection method, the collision detection method shown in FIG. 2 can function normally and accurately even under bad weather conditions.

Some embodiments of this disclosure relate to a non-transitory computer readable storage medium having computer code or instructions thereon for performing various computer-implemented operations. The term "computer readable storage medium" is used to include any medium that is capable of storing or encoding a sequence of instructions or computer code for performing the operations described herein. Examples of computer readable storage media include, but are not limited to: magnetic media; optical media; magneto-optical media; and hardware devices that are configured to store program code, such as application-specific integrated circuits (ASICs), programmable logic devices (PLDs), and ROM and RAM devices.

Examples of computer code include machine code, such as produced by a compiler, and files containing higher-level code that are executed by a processor using an interpreter or a compiler. For example, some embodiments of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote device to a requesting device via a transmission channel. Other embodiments of this disclosure may be implemented in hardwired circuitry in place of, or in combination with, processor-executable software instructions.

Amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A computer-implemented method comprising:
receiving a first metric of a first object;
receiving a second metric of a second object;
calculating a distance between the first object and the second object based on the first metric and the second metric;
comparing the calculated distance with a predetermined distance;
identifying whether the second object is approaching the first object based on a moving direction of the first object, wherein the moving direction of the first object is determined based on at least five positions of the first object using linear regression and is expressed in a linear equation;
calculating an elevational difference between the first object and the second object; and
generating a notification responsive to the calculated distance being less than the predetermined distance, the second object being identified as approaching the first object and the calculated elevational difference between the first object and the second object being less than a predetermined value;
wherein identifying whether the second object is approaching the first object comprises:
determining whether the second object is located on a right side of the moving direction of the first object or a left side of the moving direction of the first object;
determining whether the second object is heading toward the right side of the moving direction of the first object or the left side of the moving direction of the first object; and
identifying the second object as approaching the first object under any one of the following conditions: (i) the second object is located at the right side of the moving direction of the first object and heading toward the left side of the moving direction of the first object; and (ii) the second object is located at the left side of the moving direction of the first object and heading toward the right side of the moving direction of the first object.

2. The computer-implemented method of claim 1, wherein the first metric comprises a first latitude, a first longitude, a first speed and a first elevation of the first object, and the second metric comprises a second latitude, a second longitude, a second speed and a second elevation of the second object.

3. The computer-implemented method of claim 2, wherein the predetermined distance is determined based on a maximum speed of the first object and the second object.

4. The computer-implemented method of claim 2, wherein the distance between the first object and the second object is determined based on the first latitude and the first longitude of the first object and the second latitude and the second longitude of the second object.

5. A system for identifying a relative position between a first object and a second object, the system comprising:
a receiver configured to receive a first metric of the first object and a second metric of the second object; and
a processor configured to:
calculate a distance between the first object and the second object based on the first metric and the second metric;
compare the calculated distance with a predetermined distance;
identify whether the second object is approaching the first object based on a moving direction of the first object, wherein the moving direction of the first object is determined based on at least five positions of the first object using linear regression and is expressed in a linear equation;
calculate an elevational difference between the first object and the second object; and
generate a notification responsive to the calculated distance being less than the predetermined distance, the second object being identified as approaching the first object and the calculated elevational difference between the first object and the second object being less than a predetermined value;
wherein the processor is configured to identify whether the second object is approaching the first object by:
determining whether the second object is located on a right side of the moving direction of the first object or a left side of the moving direction of the first object;
determining whether the second object is heading toward the right side of the moving direction of the first object or the left side of the moving direction of the first object; and
identifying the second object as approaching the first object under any one of the following conditions: (i) the second object is located at the right side of the moving direction of the first object and heading toward the left side of the moving direction of the first object; and (ii) the second object is located at the left side of the moving direction of the first object and heading toward the right side of the moving direction of the first object.

6. The system of claim 5, wherein the receiver comprises:
a global positioning system (GPS) receiver configured to receive the first metric of the first object; and
a broadcaster configured to broadcast the first metric of the first object and to receive the second metric of the second object.

7. The system of claim 5, wherein the first metric comprises a first latitude, a first longitude, a first speed and a first elevation of the first object, and the second metric comprises a second latitude, a second longitude, a second speed and a second elevation of the second object.

8. The system of claim 7, wherein the predetermined distance is determined based on a maximum speed of the first object and the second object.

9. The system of claim 7, wherein the distance between the first object and the second object is determined based on the first latitude and the first longitude of the first object and the second latitude and the second longitude of the second object.

10. The system of claim 5, further comprising:
a transmitter configured to send the notification wirelessly; and
a display device configured to show the notification.

11. A non-transitory computer readable medium on which instructions are stored, the instructions, when executed by one or more processors, cause the one or more processors to perform a method, the method comprising:
receiving a first metric of a first object;
receiving a second metric of a second object;
calculating a distance between the first object and the second object based on the first metric and the second metric;
comparing the calculated distance with a predetermined distance;
identifying whether the second object is approaching the first object based on a moving direction of the first object, wherein the moving direction of the first object is determined based on at least five positions of the first object using linear regression and is expressed in a linear equation;
calculating an elevational difference between the first object and the second object; and
generating a notification responsive to the calculated distance being less than the predetermined distance, the second object being identified as approaching the first object and the calculated elevational difference between the first object and the second object being less than a predetermined value;
wherein identifying whether the second object is approaching the first object comprises:
determining whether the second object is located on a right side of the moving direction of the first object or a left side of the moving direction of the first object;
determining whether the second object is heading toward the right side of the moving direction of the first object or the left side of the moving direction of the first object; and
identifying the second object as approaching the first object under any one of the following conditions: (i) the second object is located at the right side of the moving direction of the first object and heading toward the left side of the moving direction of the first object; and (ii) the second object is located at the left side of the moving direction of the first object and heading toward the right side of the moving direction of the first object.

12. The non-transitory computer readable medium of claim 11, wherein the first metric comprises a first latitude, a first longitude, a first speed and a first elevation of the first object, and the second metric comprises a second latitude, a second longitude, a second speed and a second elevation of the second object.

13. The non-transitory computer readable medium of claim 12, wherein the predetermined distance is determined based on a maximum speed of the first object and the second object.

14. The non-transitory computer readable medium of claim 12, wherein the distance between the first object and the second object is determined based on the first latitude and the first longitude of the first object and the second latitude and the second longitude of the second object.

* * * * *